Patented Feb. 22, 1944

2,342,607

UNITED STATES PATENT OFFICE 2,342,607

ALDEHYDO-CARBOXYLIC ACID

Herman A. Bruson and Thomas W. Riener, Philadelphia, Pa., assignors to The Resinous Products & Chemical Company, Philadelphia, Pa., a corporation of Delaware No Drawing. Application March 16, 1943,
Serial No. 479,338

5 Claims. (Cl. 260—526)

This invention relates to new aldehydo carboxylic acids having the general formula

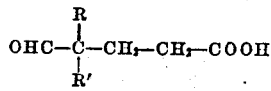

wherein R and R' are each monovalent hydrocarbon groups.

We have found that aldehydo carboxylic acids of the above structure may be obtained by hydrolyzing the corresponding cyano tertiary aldehydes

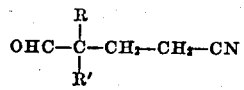

with aqueous solutions of alkalies or inorganic acids.

Although it is known that the —C≡N group of lower nitriles may be hydrated in the presence of alkali or acid and the resulting product split, higher or complex nitriles are not in general readily hydrolyzed to salt or acid. Contrary to what would be expected, we have found that in the case of the new aldehydonitriles hydrolysis is accomplished without difficulty even in the case of cyano tertiary aldehydes having large or highly branched substituents. There is a surprising stability to the aldehydo-group of tertiary aldehydo-nitriles during the hydrolysis reaction and there is no recognition prior to the present invention that the aldehydo group would remain intact. Most known aldehydes, including tertiary aldehydes, are extremely sensitive to alkalies, suffering disproportionation, condensation, oxidation, or resinification in their presence. In contrast to the accepted facts concerning nitrile and aldehydo groups, the cyano tertiary aldehydes give high yields of pure tertiary aldehydo acids without appreciable loss through the usual reaction involving aldehydes and alkalies or acids.

This behavior of the cyano aldehydes is all the more remarkable in view of the fact that the aldehydo group in the new aldehydo acids retains its capacity to undergo typical reactions of aldehydes, such as reactions with hydrogen, hydrogen cyanide, hydroxyl-amine, phenylhydrazine, urea, melamine, dicyandiamide, primary amines, ammonia, or hydrogen sulfide. Likewise, it has been found that the aldehydo group in the new acids reacts with compounds having a reactive methylene group between two ethenoid carbon atoms in a carbocycle such as in indene, fluorene, or cyclopentadiene. Similarly, the tertiary aldehydes of this invention condense with ketones, aldehydes, or nitro-paraffins having active methyl or methylene groups contiguous to the multiple-bonded functional group, carbonyl or nitro, as the case may be. The aldehydo group may be oxidized to form dibasic acids or reduced to form alcohols which at once form lactones.

The tertiary aldehydo nitriles used as starting materials are new compounds obtainable by reacting acrylonitrile in the presence of an alkaline condensing agent with disubstituted acetaldehydes as described in our copending application Serial No. 466,050, filed November 18, 1942.

In this copending application it is shown that in the presence of such alkaline condensing agents as hydroxides, oxides, amides, or hydrides of the alkali metals, lithium, potassium, sodium, etc. or in the presence of these metals themselves, or in the presence of quaternary ammonium hydroxides including benzyl trimethyl, dibenzyl dimethyl, benzyl triethyl, or other quaternary ammonium hydroxide, there is a reaction between aldehydes and acrylonitrile yielding beta-cyanoethylated products. The aldehydes having the structure R(R')CH—CHO are of considerable importance, particularly when R and R' are monovalent aliphatic hydrocarbon radicals. Typical disubstituted aldehydes which may be used are the dimethyl, methyl ethyl, diethyl, ethyl propyl, ethyl isopropyl, ethyl butyl, methyl butyl, methyl hexyl, methyl octyl, methyl dodecyl or octadecyl, dipropyl, diphenyl, ditolyl, methyl phenyl, methyl tert.-butylphenyl, and methyl benzyl acetaldehydes. Similar aldehydes having unsaturated aliphatic groups may likewise be used. The same end effect is obtained by using substituted acroleins, which, we have now established, undergo a rearrangement in the presence of an alkaline catalyst. For example, there may be used as starting materials tiglic aldehyde, or alpha-methyl-beta-ethyl acrolein, alpha-ethyl-beta-propyl acrolein, or other similar aldehyde. Upon reaction with acrylonitrile in the presence of an alkaline condensing agent these aldehydes form derivatives which are cyanoethylated in the alpha-position as the result of shifting of a hydrogen atom and of the double bond. Thus, there results from the above aldehydes the following compounds:

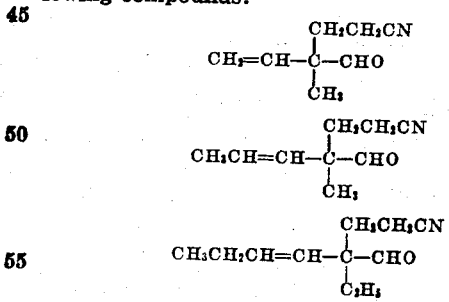

These can be converted to the corresponding unsaturated acids, as herein disclosed.

The hydrolysis of the cyano tertiary aldehydes may be carried out over a wide range of conditions as to concentration of hydrolyzing agents and temperatures. In general at least one mol of such agent per mol of cyanoaldehyde should be used to ensure complete conversion. Excess is obviously helpful in driving the reaction to completion. Removal of ammonia by boiling under normal or reduced pressures also helps to complete the hydration and splitting necessary to yield the carboxylic form. Concentrations of a strong alkali, such as sodium or potassium hydroxide, may vary from about 2% to 25%. Temperatures may vary from about 65° to about 125° C. During the reaction substituted hydrogenation pyridones may be formed and it is necessary to continue the reaction for a sufficient length of time to break these down into the carboxylic form. When the hydrolysis has been carried to practical completion, the reaction mixture may be treated in conventional ways to liberate the aldehydo acid.

The following examples illustrate this invention, the parts being by weight.

Example 1

To a stirred mixture of 200 parts of diethyl acetaldehyde and 10 parts of 30% methanolic potassium hydroxide solution, there was gradually added 106 parts of acrylonitrile at 30°–35° C. while the reaction mixture was cooled. The temperature rose to about 50° C. after all the reactants had been combined. The reaction mixture was then stirred for two hours after which time no further heat was evolved. The mixture was thereupon acidified with dilute hydrochloric acid, washed several times with warm water, dried, and distilled in vacuo. The product obtained had the formula:

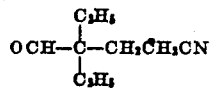

and distilled at 115°–130° C. 5 mm. as a colorless oil in a yield of about 200 parts.

This was hydrolyzed by boiling 153 parts of it with a solution of 50 parts of sodium hydroxide and 500 parts of water while the mixture was stirred under reflux. After one and one-half hours of boiling all of the oil consisting of alpha-(2-cyano-ethyl)-alpha-ethyl butyraldehyde had dissolved. The mixture was acidified with hydrochloric acid resulting in the separation of an oil layer. The oil which separated was run off, washed with water, dried, and distilled in vacuo. The product was alpha-diethyl glutaric acid half aldehyde

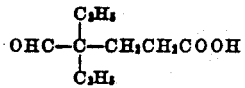

It distilled at 145–150° C./5 mm. as a colorless oil in a yield of 130 parts. Upon redistillation it boiled at 140–145° C./3 mm. Upon oxidation with air, alkaline hydrogen peroxide, potassium permanganate or sodium hypochlorite, it yields the corresponding alpha, alpha-diethyl-glutaric acid, which is a new compound consisting of colorless needles melting at 84° C.

Example 2

To a stirred mixture of 126 parts of 2-ethyl-3-propylacrolein, 126 parts of tertiary butyl alcohol, and 5 parts of methanolic 30% potassium hydroxide there was gradually added 53 parts of acrylonitrile at 25–35° C. The mixture was stirred thereafter for two hours, then acidified with dilute hydrochloric acid, washed with water, dried, and distilled in vacuo. The product, having the formula

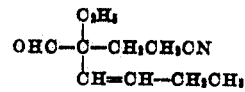

distilled at 140°–145° C./6 mm. in a yield of 80 parts.

This was saponified by boiling with a solution of 30 parts of sodium hydroxide and 300 parts of water for five hours under reflux. The product separated as an oil when the solution was treated with hydrochloric acid. The oil was washed, dried, and distilled in vacuo. The product having the formula

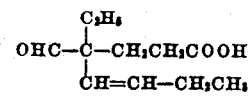

distilled at 160°–170° C./5 mm. as a pale yellow oil in a yield of 50 parts. Upon redistillation it boiled at 153°–156° C./4 mm.

Example 3

To a stirred solution of 505 parts of ethylbutyl-acetaldehyde, 300 parts of tertiary butyl alcohol, and 40 parts of methanolic 30% potassium hydroxide solution there was added dropwise 265 parts of acrylonitrile during the course of one and one-quarter hours while the reaction temperature was maintained at 35°–45° C. The mixture was stirred for an additional four hours at room temperature, then acidified with dilute hydrochloric acid resulting in separation of an oil which was washed with water. The oil was separated, dried, and distilled in vacuo. The product having the formula

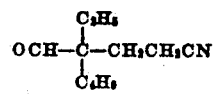

distilled at 140°–150° C./6 mm. as a colorless oil in a yield of 370 parts. Upon redistillation it boiled at 145°–150° C./7 mm.

A mixture of 30 parts of the above cyanoaldehyde, 15 parts of potassium hydroxide, and 125 parts of water was boiled under reflux for five hours. The product was acidified with dilute hydrochloric acid with precipitation of an oil which was washed, dried, and distilled in vacuo. The product having the formula

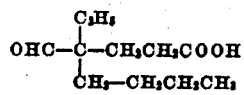

distilled at 160°–168° C./4 mm. as a colorless oil in a yield of 25 parts. Upon redistillation it boiled at 155°–160° C./4 mm. Upon oxidation it yields alpha-ethyl-alpha-butyl-glutaric acid, which is a new compound consisting of colorless needles melting at 81°–82° C.

By generally the same procedure as shown above, the cyanoethylation product of methylhexyl-acetaldehyde yields, upon saponification with aqueous sodium hydroxide, potassium hydroxide, or hydrochloric acid, the corresponding aldehydo-acid

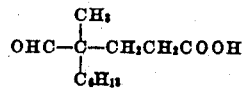

as a colorless high boiling oil.

The above-described reactions are applicable to cyanoethylated saturated or unsaturated disubstituted acetaldehydes

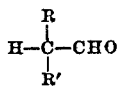

in which R and R' are in particular straight chained or branched chain monovalent hydrocarbon groups.

The tertiary aldehyde acids, their salts and esters are useful intermediates for the preparation of drugs, synthetic fibres, plastics, resins, plasticizers, and perfumes.

We claim:

1. As a new compound, a tertiary aldehydo-acid having the formula

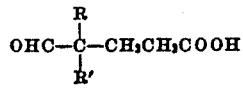

wherein R and R' are monovalent hydrocarbon groups.

2. As a new compound, a tertiary aldehydo-acid having the formula

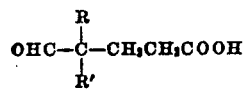

wherein R and R' are monovalent aliphatic hydrocarbon groups.

3. As a new compound, the tertiary aldehydo acid having the formula

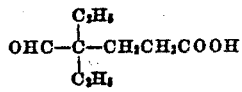

4. As a new compound, the tertiary aldehydo acid having the formula

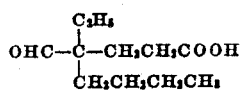

5. As a new compound, the tertiary aldehydo acid having the formula

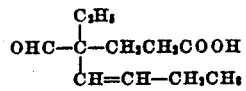

HERMAN A. BRUSON.
THOMAS W. RIENER.